Aug. 11, 1931.    G. C. SUPPLEE    1,817,936
METHOD OF IRRADIATING MILK SOLIDS WITH ULTRA
VIOLET RAYS AND THE PRODUCT OF SUCH METHOD
Filed June 2, 1926    3 Sheets-Sheet 1
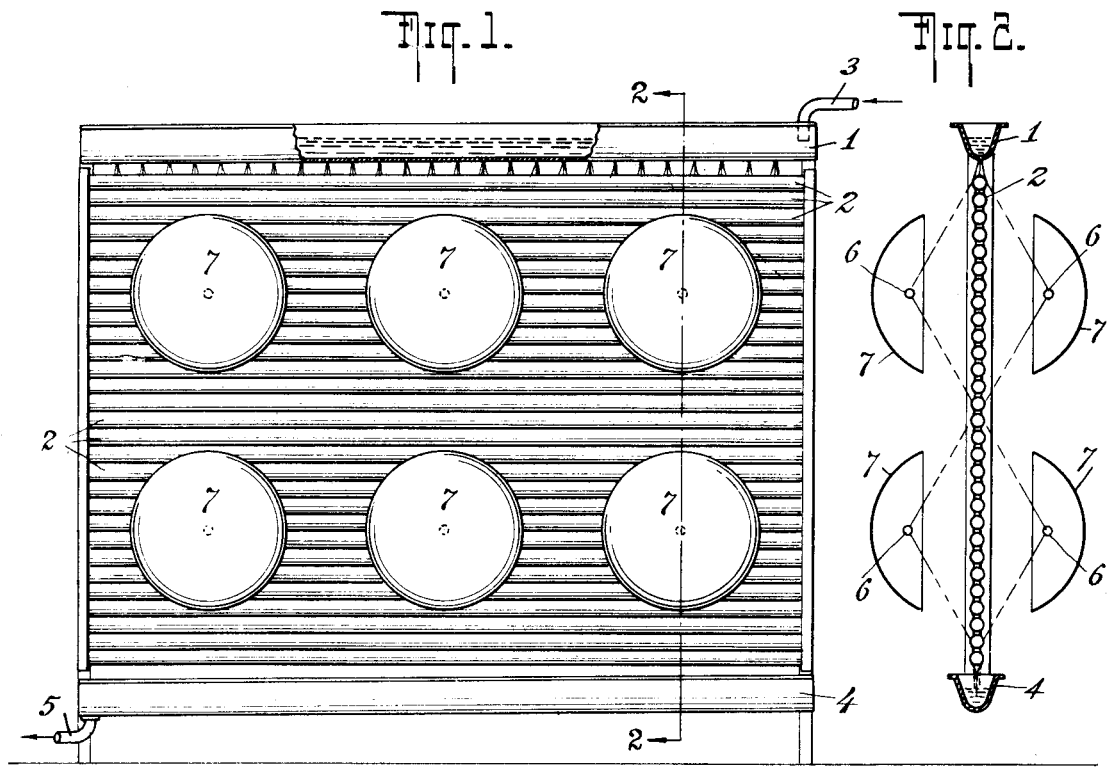
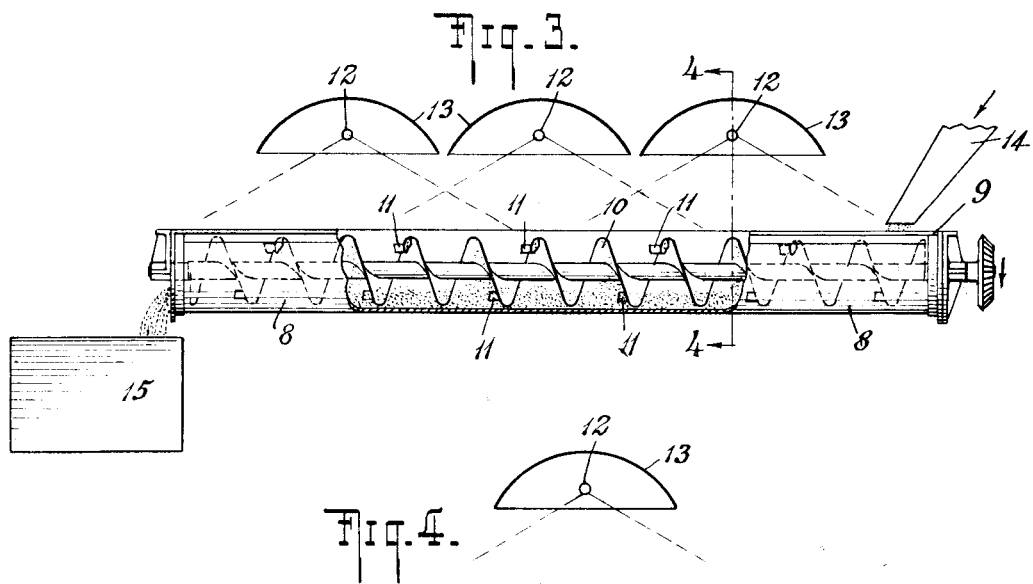
WITNESS
G. V. Rasmussen
INVENTOR
GEORGE C. SUPPLEE
BY
ATTORNEYS

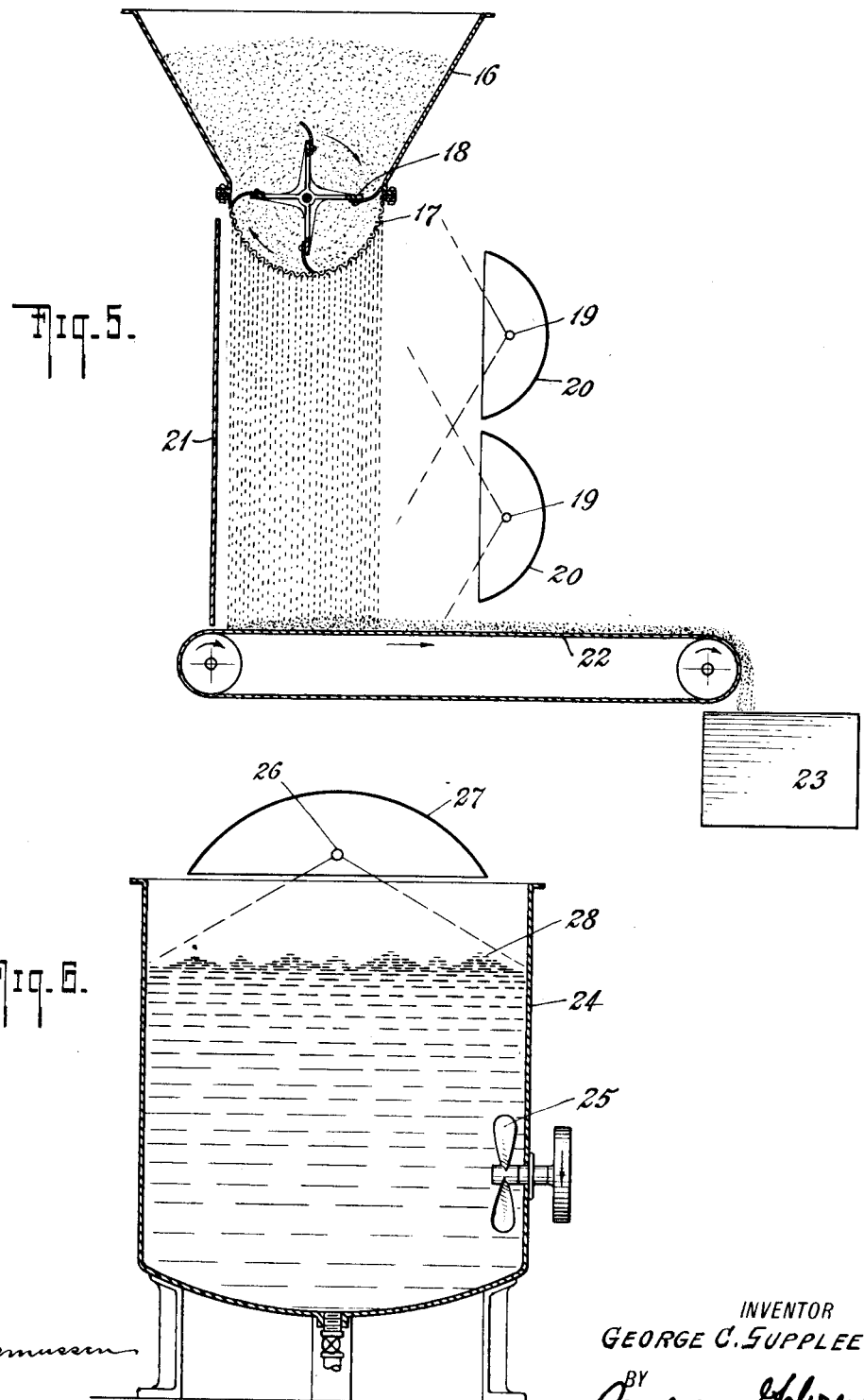

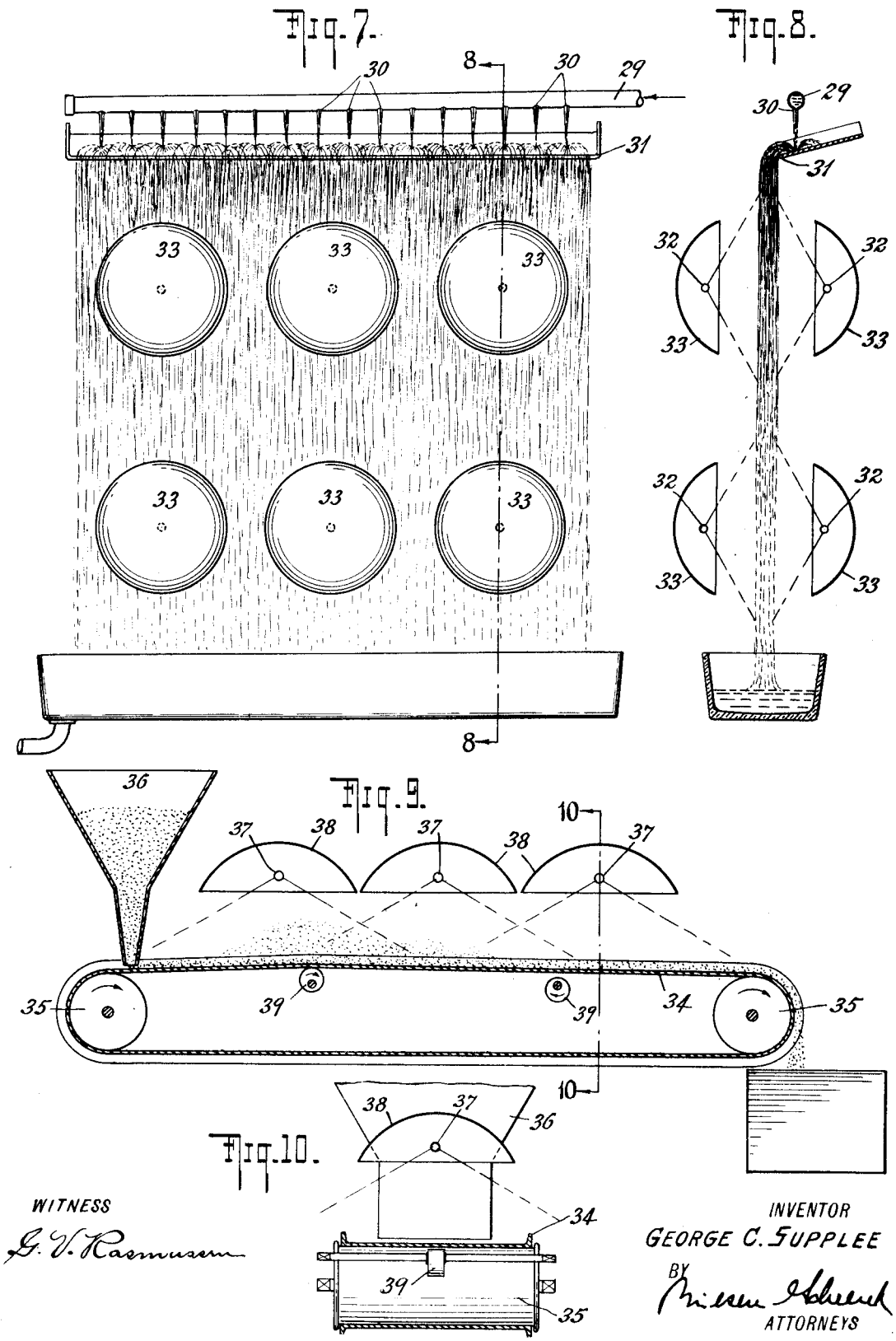

Patented Aug. 11, 1931

1,817,936

UNITED STATES PATENT OFFICE

GEORGE C. SUPPLEE, OF BAINBRIDGE, NEW YORK, ASSIGNOR, BY MESNE ASSIGNMENTS, TO THE BORDEN COMPANY, OF NEW YORK, N. Y., A CORPORATION OF NEW JERSEY

METHOD OF IRRADIATING MILK SOLIDS WITH ULTRA-VIOLET RAYS AND THE PRODUCT OF SUCH METHOD

Application filed June 2, 1926. Serial No. 113,268.

It is now well established that foods, including milk, which have been subjected to irradiation by ultra-violet light, are useful in the cure and prevention of rickets. See, for instance, the following publications:

Journal of American Medical Association, vol. 84, p. 1910, June 20, 1925—Alfred S. Hess—Anti-rachitic activation of foods and of cholesterol by ultra-violet light irradiation.

Same journal, same volume, p. 1093, April 11, 1925—Steenbock and Daniels—Irradiated foods and irradiated organic compounds.

American Journal of Diseases of Children, vol. 26, p. 441, December, 1925—Steenbock, Hart, Hoppert and Black—The anti-rachitic property of milk and its increase by direct irradiation and irradiation on the animal.

American Journal of Diseases of Children, vol. 30, p. 195, August, 1925—Benjamin Kramer—Rickets in infants: treatment with irradiated milk.

In so far as these publications describe treatment of milk, either dry or liquid, they show that it has apparently been deemed necessary to expose these substances to the ultra-violet light rays for a substantial length of time, the exposure indicated therein being from thirty minutes to two hours. Kramer suggests that a period of two hours may be unnecessarily long and "that equally good results may be obtained with much shorter exposure, probably from ten to twenty minutes". Milk has extremely low anti-rachitic properties. I have found that milk in dry or liquid form may be given anti-rachitic or bone forming properties by exposure to ultra-violet rays for an extremely short time, under proper conditions as low as eight seconds, provided the milk solids be kept well separated and preferably in motion during the period of exposure. I have found, furthermore, that liquid milk irradiated even for so short a time will retain its anti-rachitic or bone forming properties after subsequent drying to powder form. For all practical purposes, milk so treated possesses these properties to substantially the same degree as milk which has been exposed to irradiation for one or two hours, although I am not as yet prepared to state that the bone formation test will show quite as high results with my improved milk as with milk which has been exposed for a very much longer time. My milk, however, has the advantage that it does not acquire disagreeable flavor and odor, such as is acquired by milk irradiated for a much longer period of time. Tests made by me have shown, furthermore, that milk treated by my method has retained in active form the larger proportion of its original vitamin A content. Vitamin A is destroyed by prolonged exposure to ultra-violet rays, thus depriving the milk of its growth-forming properties.

In carrying out my process I expose the milk to the ultra-violet rays which may be emitted by any suitable lamp, such as the well known quartz mercury-vapor lamp, preferably provided with the usual reflector. In treating dry milk in powder form I separate and keep in motion the milk particles by any suitable means, for instance by passing them through a sieve, and exposing them to the rays as they fall from the sieve into a suitable receptacle; or by placing them on a thin metal plate or on a belt conveyor and vibrating the plate or belt; or by passing them through an agitating conveyor. I may also expose the dry milk to the rays as it drops away under the action of the doctor blade in a drying apparatus such as shown in patent to Just, No. 712,545, dated November 4, 1902.

When treating the liquid milk, I may spray the same into the form of a sheet and submit the spray to the ultra-violet rays, or I may irradiate the milk as it passes over the corrugated surface of an ordinary milk cooler. I may find it desirable under some conditions to expose a large body of liquid milk to the rays, stirring such body, however, during the time of exposure, so that each portion thereof is exposed for a short time only. The liquid milk subjected to the irradiation, for a sufficient length of time may then be dried by any suitable method, such as by spraying or over a Just drum without losing any, or at least no appreciable, proportion of its anti-rachitic properties.

Generally speaking, liquid milk need be exposed to the rays for a shorter time than dry milk in order to obtain equivalent results. This may be due to the fact that liquid milk contains less milk solids per unit of measure than dry milk. In any event, milk solids in either dry milk or liquid milk should not be exposed to the rays for so long a time as to cause the disagreeable odor and/or flavor hereinabove referred to, to develop. Generally speaking, from two to three minutes is the highest permissible time of exposure for liquid milk and from five to ten minutes for dry milk, other things being equal, as at the end of such time the flavor and/or odor has already become noticeable. I prefer, however, not to expose the milk for anywhere near such length of time, not only to avoid unnecessary destruction of the vitamin A content but also to avoid unnecessary length of processing. The shorter the time of exposure, the more milk can obviously be treated within a given time and the less costly is the process. As already indicated, I have found that the larger proportion of anti-rachitic properties, conservatively estimated at 75%, can be imparted to the milk within a period of time more readily measured by seconds. Other things being equal, I prefer to expose liquid milk for from 16 to 24 seconds, and dry milk from 2 to 5 minutes. It should, of course, be understood that when I speak of exposing the particles of milk solids to the rays for a given length of time, I mean actual exposure and not the time of the process as a whole, as in some of the processes each particle may not be exposed to the rays during the entire period; for instance, the liquid milk in a tankful of milk whose surface is exposed to the rays, may be agitated for fifteen minutes during which each particle may be exposed to the rays for a few seconds only. It is also obvious that the time of exposure will have to be varied in accordance with the strength of the lamp and its distance from the milk, the further away or the weaker the lamp, other things being equal, the longer being the time of exposure.

I am not at this time able to account for the rather surprising fact that milk can have imparted to it within an extremely short period of time anti-rachitic and bone forming properties, substantially and for all practical purposes equal, or almost equal, to those obtained by the experimenters hereinabove referred to, who deemed it necessary to irradiate the milk for very long periods of time, even at the cost of spoiling the flavor and odor thereof. It has occurred to me that when the body of milk, whether dry or liquid, is not in motion, the fat content thereof more effectively retards activation. It is well known that in high altitudes, fat, for instance tallow (grease paint), is an almost perfect protection to the human skin from the ultra-violet rays of the sun. It is also known that cod liver oil retains its anti-rachitic properties for an indefinite length of time and it is at least theoretically assumed that such properties are due to the activation by ultra-violet rays of one or more of its ingredients and it may therefore well be that the fat contents of such oil serve to prevent the loss of radiant energy. While these facts may suggest an explanation, I desire it to be understood that I do not wish to stand committed in any sense to any theory which may be suggested thereby.

In the drawings which illustrate various forms of apparatus which I may employ in the operation of my process, Fig. 1 is a side view of an ordinary milk cooling apparatus provided with lamps in accordance with my invention; Fig. 2 is a cross-section on the line 2—2 of Fig. 1; Fig. 3 shows a conveyor for feeding and agitating dried milk while subjecting it to the rays of lamps; Fig. 4 is a cross-section on the line 4—4 of Fig. 3; Fig. 5 shows a hopper with screen bottom and juxtaposed lamps for treating dried milk; Fig. 6 shows a tank and associated lamp for treating a body of liquid milk; Fig. 7 shows an apparatus for producing and treating a sheet of flowing liquid milk; Fig. 8 is a cross-section on the line 8—8 of Fig. 7; Fig. 9 shows a conveyor and lamps for treating dry milk, and Fig. 10 is a cross-section on the line 10—10 of Fig. 9.

In Figs. 1 and 2, 1 is the usual perforated bottom trough and 2, 2 are the usual horizontal cooling pipes of the well-known milk cooling apparatus. Milk is fed to trough 1 through pipe 3 and flows over the pipes 2, 2, being collected in trough 4 whence it flows to a suitable container through pipe 5. 6, 6 are suitable ultra-violet lamps provided with reflectors 7.

*Example*

Over an apparatus, such as shown in Fig. 1, whose pipes are fifteen feet long and stacked up ten feet high and have a diameter of approximately 2½ inches (a standard milk cooling device) I flow fresh liquid milk at the rate of about 9500 pounds per hour. On each side I provide three lamps and three reflectors, the lamps being located about one foot from the surface of the nearest pipe, the lamps and reflectors being so arranged that the milk flowing over the upper half of the apparatus (five feet high) is sprayed with ultra-violet rays. The lower three lamps, shown in Fig. 1, may for the present be regarded as being out of operation. Each particle of milk will thus be exposed to the rays for about eight seconds, that is, while flowing over the upper half of the apparatus. The milk so treated, even after it has been dried, possesses anti-rachitic and bone forming value to a high degree. If now the treated liquid milk is replaced in trough 1 and again subjected to the same treatment, or if the lower three lamps shown in Fig. 1 are put into operation, so that the liquid milk is exposed to the rays for sixteen seconds, an increase in anti-rachitic and bone forming properties will be obtained, but such increase is not at all in proportion to the increased time of subjection to the rays. With a larger apparatus or by again flowing the milk over the apparatus of Fig. 1 and exposing it for a further eight seconds, or twenty-four seconds in all, only a slight further increase in anti-rachitic and bone forming properties is obtained. As shown in the subjoined table, the milk, after exposure for only eight seconds, has acquired the properties in question to about the full extent to which it can acquire them without being exposed for so long a time, two or three minutes, as to cause it to acquire a disagreeable odor and/or flavor. Apparently by my method the liquid milk may be given, by exposure to the rays for a fraction of a minute only, the desired properties to substantially the full extent to which it can acquire them within the entire permitted period.

The treatment may be given to the milk while it is subjected to the ordinary cooling process in an apparatus of the type shown in Fig. 1, in which pipes 2 are filled with cold water or other cooling substance.

| Time of exposure | Per cent ash in bones with animals receiving 4 cc. per day of the test substance (reconstituted dry milk) |
|---|---|
| Liquid milk not exposed | 43.29 |
| Liquid milk exposed 8 secs | 49.51 |
| Liquid milk exposed 24 secs | 51.70 |
| Liquid milk exposed 48 secs | 52.56 |

Figs. 3 and 4 show a conveyor 8 having the usual trough 9 and the usual feed screw 10 to which, however, have been attached plates 11. Above the conveyor are provided ultra-violet lamps 12 and reflectors 13. Dry milk is fed to the conveyor through chute 14 and is then fed forwardly by screw 10 while being agitated or tossed upwardly by plates 11, until it drops into container 15. With a conveyor such as shown, in which the trough 9 has an inside depth of seven inches and an inside top width of 6¾ inches through which dry milk is passed at about the depth shown by the dotted line, in from two to three minutes so as to be exposed to the rays of lamps 12 for approximately such length of time, the lamps are located about ten inches from the top of the powder. The dry milk should not be passed through the conveyor so slowly that exposure to the lamps affects its odor or flavor unfavorably. As in the case of a liquid milk, the dry milk receives the greatest proportion of its activation within the earliest stages of exposure, longer exposure within the limit stated adding to, but not increasing to a considerable extent, the activation. Within such limit the length of time of exposure should, of course, correspond to the activation desired in the finished product. Just what is the degree of activation can readily be determined by the methods disclosed in the publications hereinabove referred to.

In Fig. 5, 16 is a hopper ending in a sieve 17 and provided with a stirrer 18. 19 are the lamps and 20 the reflectors. A light-reflecting surface 21 may be provided. Powdered milk is placed into the hopper 16 and allowed to fall through sieve 17 onto a conveyor 22 by which it is carried to container 23, being exposed during its fall from sieve 17 to conveyor 22, to the rays of lamps 19. The time and degree of exposure should be regulated by the rule which applies to all the specific embodiments of my invention, namely, not so long as to cause a disagreeable flavor or odor to develop, but long enough to obtain the desired degree of activation.

Fig. 6 shows a tank 24 provided with a stirrer 25, lamp 26 and reflector 27. The tank contains a body of liquid milk 28. The liquid milk is exposed to the rays of the lamp 26 while it is being violently agitated by the stirrer 25. The individual particles of the milk are therefore exposed to the rays for a comparatively large number of very short periods of time. With a circular tank such as shown 3 feet in diameter containing about 1000 pounds of milk, a lamp 12 inches from the surface of the milk and a reflector adapted to reflect the light upon the entire surface, the milk is irradiated to a commercially practicable degree in 45 minutes, the stirrer 25 provided with three plates making about 160 R. P. M. For any given case the conditions can be determined by the rule hereinabove given.

Figs. 7 and 8 show a pipe 29 apertured at 30 through which milk flows in streams onto a knife-edge plate 31, then falling in the form of a curtain past lamps 32 provided with reflectors 33.

Figs. 9 and 10 show a belt conveyor 34 running on pulleys 35 to which a thin layer of dry milk is applied through hopper 36 and on which it is exposed to the rays of lamps 37 provided with reflectors 38. The powder traveling on the belt should be agitated in some suitable manner so as to separate the particles as much as possible. This could be done, for instance, by striking the lower surface of the upper portion of the belt with eccentrics 39. The detailed explanation given with respect to the operation of the apparatus shown in Figs. 1 to 6, will make it clear how the apparatus shown in Figs. 7 to 10 are to be operated.

It will be noted that in all the specific embodiments of my invention I agitate the particles of milk, that is to say, I move them in such a manner that they present different portions of their surface to the light rays.

The lamps specifically referred to hereinabove are quartz mercury vapor lamps, reasonably new, operating at approximately 600 watts, and found on the market under the name of Hanovia Luxor model.

I claim:

1. The improvement in the art of irradiating milk which comprises agitating the particles thereof and spraying them with ultra-violet rays of such intensity that at least 75% of the total anti-rachitic properties which can be produced in the milk are produced before a disagreeable odor or flavor is imparted to the milk, and ceasing such spraying before the milk acquires such odor or flavor.

2. The improvement in the art of irradiating dry milk powder which comprises agitating such powder to separate the particles thereof and simultaneously spraying it with ultra-violet rays of such intensity that at least 75% of the total anti-rachitic properties which can be produced in the milk are produced before a disagreeable odor or flavor is imparted to the milk, and ceasing such spraying before the milk acquires such odor or flavor.

3. As an article of manufacture, milk free from disagreeable odor and flavor which has been irradiated with ultra-violet rays until it has acquired at least 75% of the total anti-rachitic properties which can be produced in such milk.

GEORGE C. SUPPLEE.